United States Patent

[11] 3,562,433

[72] Inventor Mario Ambrosio
West Deal, N.J.
[21] Appl. No. 740,612
[22] Filed June 27, 1968
[45] Patented Feb. 9, 1971
[73] Assignee The United States of America as represented by the Secretary of the Army

[54] DIGITAL SPEECH PLUS TELEGRAPH SYSTEM
3 Claims, 2 Drawing Figs.

[52] U.S. Cl. .......... 179/15
[51] Int. Cl. .......... H04j 3/12
[50] Field of Search .......... 179/15A, 15ASYNC, 15SIG, 15VDR, 15.55; 340/172.5; 178/50

[56] References Cited
UNITED STATES PATENTS
3,387,086 6/1968 Beresin .......... 178/50

*Primary Examiner*—Ralph D. Blakeslee
*Attorneys*—Harry M. Saragovitz, Edward J. Kelly, Herbert Berl and Jeremiah G. Murray

ABSTRACT: A multiplex communication system for interleaving vocoder, telegraphic, and control digital signals into a single channel. A predetermined number of vocoder digits are stored in a shift register at a relatively high bit rate. These bits are then transferred in parallel to a second shift register via a series of AND gates which are gated on at a relatively low bit rate. The telegraphic and control signals are alternately inserted into the second shift register at the relatively low bit rate. The second shift register is then shifted at a rate which is the sum of the high bit rate and the low bit rate. A transmission line is connected to the output of the second shift register for transmitting the multiplexed information INVENTOR,
MARIO AMBROSIO.
BY: Jeremiah G. Murphy AGENT
Harry M. Saragovitz,
Edward J. Kelly &
Herbert Berl
ATTORNEYS

DIGITAL SPEECH PLUS TELEGRAPH SYSTEM

The present invention relates to multiplex communication systems and more particularly to a digital interleaver.

Those concerned with the development of digital telecommunications systems have long recognized the need for a simple, inexpensive multiplexing device which will not substantially degrade the information being transmitted. For example, it has been the general practice to employ multiplexing systems for transmitting, over a single channel, vocoder and telegraph information. In one of such systems the telegraph information is inserted into the vocoder channel by eliminating one or more of the bits from each of the vocoder samples and inserting the telegraph bits in place thereof. In this case however degradation of the vocoder channel can be substantial due to the loss of the vocoder bits. In another system the telegraph information is temporarily stored and inserted into the channel when pauses in the vocoder signal occur. In this case a relatively complex system is required and a relatively large storage unit is needed to insure no loss in the telegraph information in the event that pauses in the vocoder signal are infrequent.

The general purpose of this invention is to provide a simple multiplex system wherein the sampling rate of the vocoder is reduced a relatively small amount to accommodate the telegraph information. The vocoder and telegraph signals are inserted into the transmitting channel in parallel and transmitted along the channel at a rate which is greater then either of the two individual information rates. Such a system will require only simple circuitry and will result in only a negligible amount of degradation of the vocoder signal then had it been sampled at its normal transmission rate.

The exact nature of this invention as well as other objects and advantages thereof will be readily apparent from consideration of the following specification relating to the annexed drawing in which.

Figure 1:
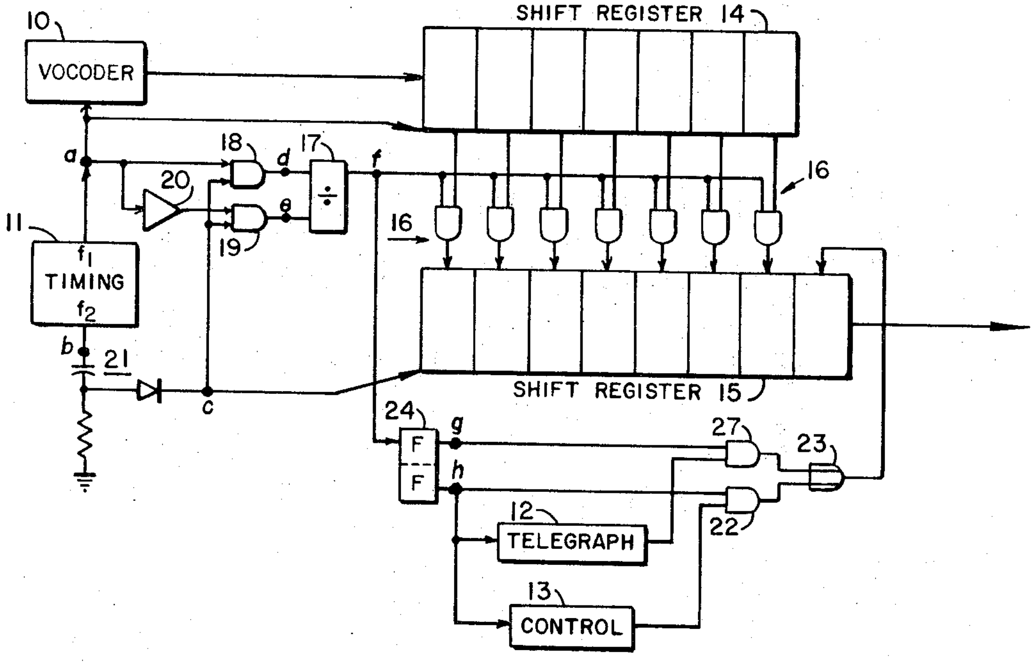
FIG. 1 is a block diagram of a preferred embodiment of the invention.

Referring now to FIG. 1 there is shown a vocoder 10, a timing device 11, a telegraph system 12, and a control 13. The timing device 11 contains clocks which generate two clock frequencies *f1* and *f2*. Signal *f1* is connected to vocoder 10 to establish the vocoder output rate while signal *f2* is used to establish the multiplex transmission rate as will be later described.

The vocoder output is inserted into a storage device such as shift register 14. Each of the stages of register 14 is connected consecutively to different stages of a second register 15 via AND gates 16 which derives a second input from the output of a frequency divider 17. Divider 17 is controlled by the outputs of a pair of AND gates 18 and 19, and an inverter 20 which in turn are connected to the *f1* output and, via impulse generator 21, to the *f2* output of timing device 11.

The last stage of register 15 receives an output from telegraph 12 and control 13 via AND gates 22 and 27 and OR gate 23. The second inputs to gates 22 and 27 are derived from opposite sides of a flip-flop 24 which in turn is controlled by the output of divider 17.

Figure 2:
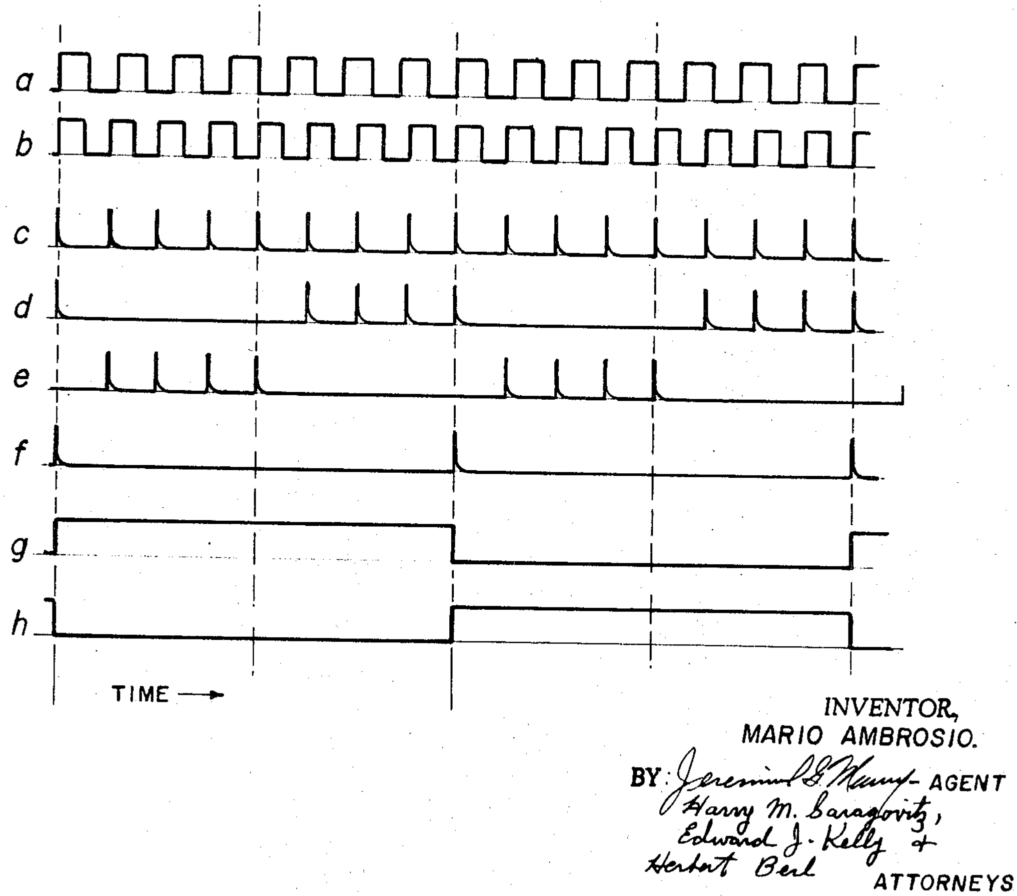
FIG. 2 is a timing diagram useful in explaining the diagram of FIG. 1.

The operation of the device will now be described with reference to FIG. 2 and by assigning values to the frequencies *f1* and *f2* (waveforms *a* and *b*) as an aid.

In general, the transmission rate of a communications system may be limited by the characteristics of the transmission line. For example, let it be assumed that the transmission line is capable of transmitting digital information at a rate of 2400 b.p.s. It would, of course, be advantageous to utilize the full capacity by transmitting the vocoder information at the 2400 b.p.s. rate. However, when additional information such as a telegraph signal, which usually requires a relativey low bit rate, is to be multiplexed with the vocoder information there will necessarily have to be some loss of the vocoder signal. To merely continue sampling the audio signal in the vocoder at the same rate and to then remove selected ones of the vocoder output bits (usually the least significant bits) to make room for the telegraph and control signals would result in a substantial degradation of the audio signal. A more advantageous procedure would be to reduce the sampling rate of the vocoder and retain the same number of bits to be used in each frame. In this way the audio signal is still quantized to the more precise values but at only a slightly slower rate.

Therefore, the timing signal *f2* (waveform *b*) will equal the transmission rate which, for example, will be assigned the value of 2400 c.p.s. The vocoder 10 will be running at a rate *f1* which is less then *f2* to compensate for the telegraph and control information to be multiplexed therewith. It will be assumed that the telegraph 12 and the control 13 are to run at equal rates of, for example, 150b.p.s. Therefore, the signal *f1* will be assigned the value of 2100 c.p.s. i.e. the line rate 2400 b.p.s. less the telegraph rate of 150 b.p.s. and the control rate of 150 b.p.s.

The information generated by vocoder 10 is stored serially in register 14 at the *f1* rate or 2100 b.p.s. When register 14, which in this case has seven stages, is full, the information therein will be transferred in parallel via AND gates 16 to register 15 by the output of divider 17 which will necessarily have an output of impulses at 300 c.p.s. (signal *f*). Register 15 will have more stages then register 14 to accommodate the telegraph and control information. As shown, register 15 has eight stages with the input of the last stage connected to the telegraph 12 and the control 13 via gates 22, 23, and 27. Gates 22 and 27 are each gated on alternately at a rate of 150 times per second (waveforms *g* and *h*). The register 15 is then shifted onto the transmission line at a 2400 b.p.s. rate (waveform *c*). The information on the line will, therefore, contain a series of seven vocoder bits preceded by an eighth bit which will alternately be either a telegraph bit or a control bit. The control bits may form a predetermined code which when detected by the receiver will establish synchronization so that the telegraph and vocoder information may be separated properly. Of course, equipment to perform this operation may be substantially the dual of that shown in FIG. 1.

Frequency divider 17 may simply be a counter which after being reset by signal *e* will count the next four pulses of signal *d* and pass the fourth pulse of signal *d* to produce signal *f*. Actually, the divider 17 and the associated gates 18, 19 and 20 produce the difference pulse rate between signals *f1* and *f2* which will be the rate at which information is to be multiplexed or interleaved with the vocoder signal.

Obviously many modifications and variations of the present invention are possible in the light of the above teachings. It is therefore to be understood, that within the scope of the appended claims, the invention may be practiced otherwise then is specifically described.

I claim:

1. A digital multiplexed communication system comprising first and second binary signal sources; clock means for driving said first binary signal sources at a relatively high output bit rate and for driving said second source at a relatively low output bit rate; a first storage means connected to said clock means and to the output of said first signal source for storing in sequence a predetermined number of said binary bits at said high bit rate; transfer means connected to said first storage means and said clock means for transferring in parallel all said binary bits out of said fist storage means; a second storage means, said transfer means and the output of said second signal source connected in parallel to said second storage means for inserting in parallel binary bits therein at said low bit rate; said clock means connected to said second storage means for serially transmitting information out of said second storage means onto a transmission line at a rate which is the sum of said low bit rate and said high bit rate; said first storage means including a shift register; the output of said first signal source connected to one end of said shift register; said clock means including shift means connected to said shift register to shift said register at said high bit rate; said second storage means including a shift register having a greater number of stages then the shift register of said first storage means; said transfer means including a plurality of AND gates equal in number to the number of stages in the shift register of said first storage means; each said register stage of said first storage means being connected by one of said AND gates to different register stages of said second storage means; and said clock means including output means connected to each said AND gate for simultaneously opening said gates at said low bit rate and further including shift means connected to the register of said second storage means for shifting said register at a rate which is the sum of said low bit rate and said high bit rate.

2. A digital multiplexed communications system for interleaving digital vocoder signals and digital telegraphic signals comprising a timing means including means for generating clock pulses at a transmission bit rate and at a vocoder bit rate being less then said transmission bit rate; vocoder means connected to said means for generating clock pulses at said vocoder bit rate; first shift register means connected to the output of said vocoder means for storing a predetermined number of said vocoder bits; said means for generating clock pulses at said vocoder bit rate being connected to said first shift register means for shifting said first register means; a second shift register means having a greater number of stages then said first shift register means; transfer means including a plurality of AND gates each connected between different stages of said first register means and different stages of said second register means for simultaneously transferring in parallel the bits in said first register means to said second register means; gating means connected to said means for generating clock pulses for producing gating pulses of a rate which is the difference between said transmission bit rate and said vocoder bit rate; said gating means being connected to each said AND gates for gating open said AND gates; telegraph means connected to one of the stages of said second register means; means controlled by said gating means for inserting telegraphic bits into said second register; means connecting said means for generating clock pulses at said transmission rate to said second register for shifting said register at said transmission rate; and a transmission means connected to the output of said second shift register means.

3. The device according to claim 2 and further including control means for generating control bits; and means controlled by said gating means for alternately inserting control bits and telegraphic bits into said second register.